April 28, 1942.    L. PETERSEN    2,281,453
ELECTROMAGNETIC MOVEMENT REPEATING SYSTEM
Filed May 11, 1939    4 Sheets-Sheet 3

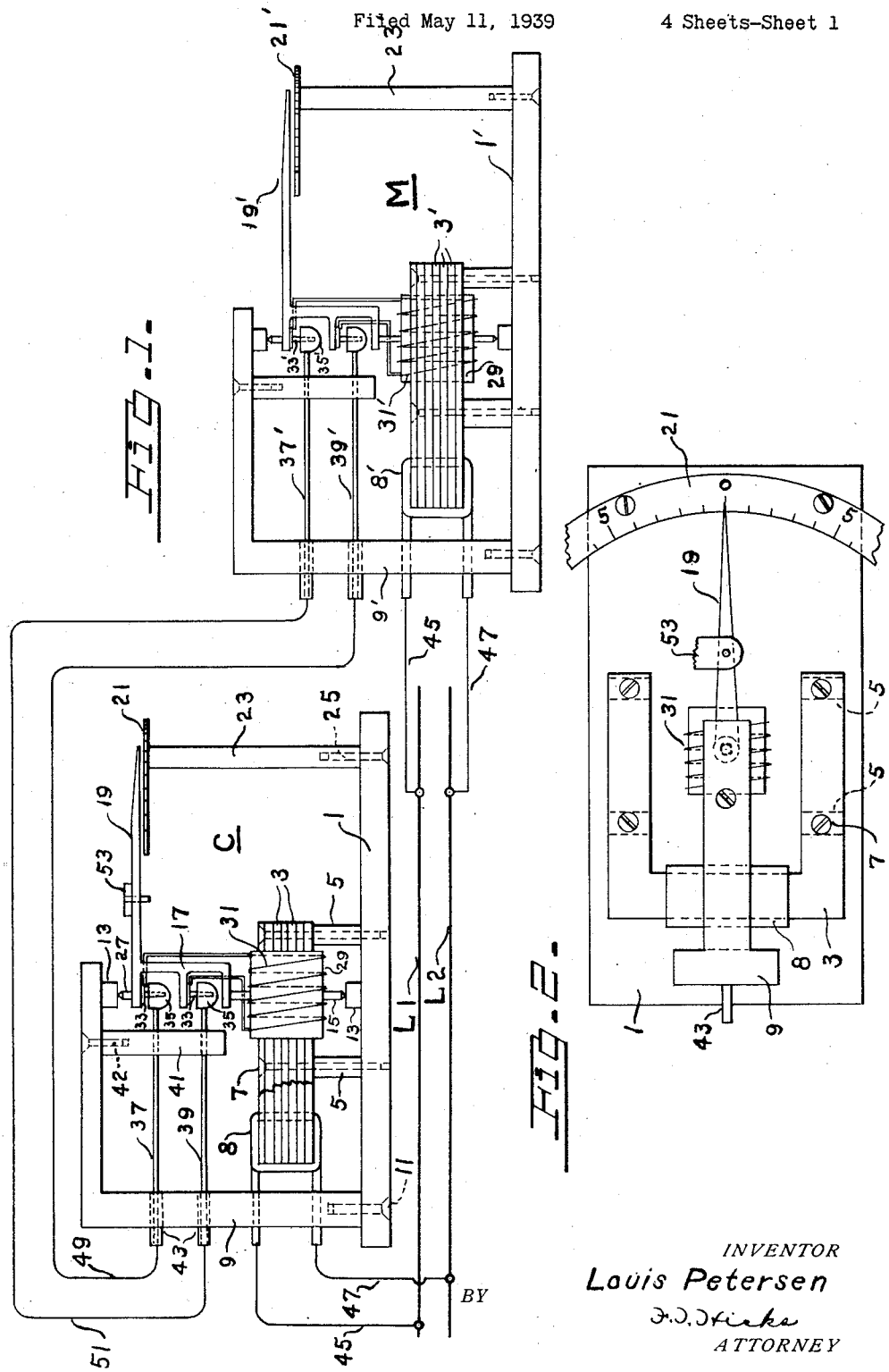

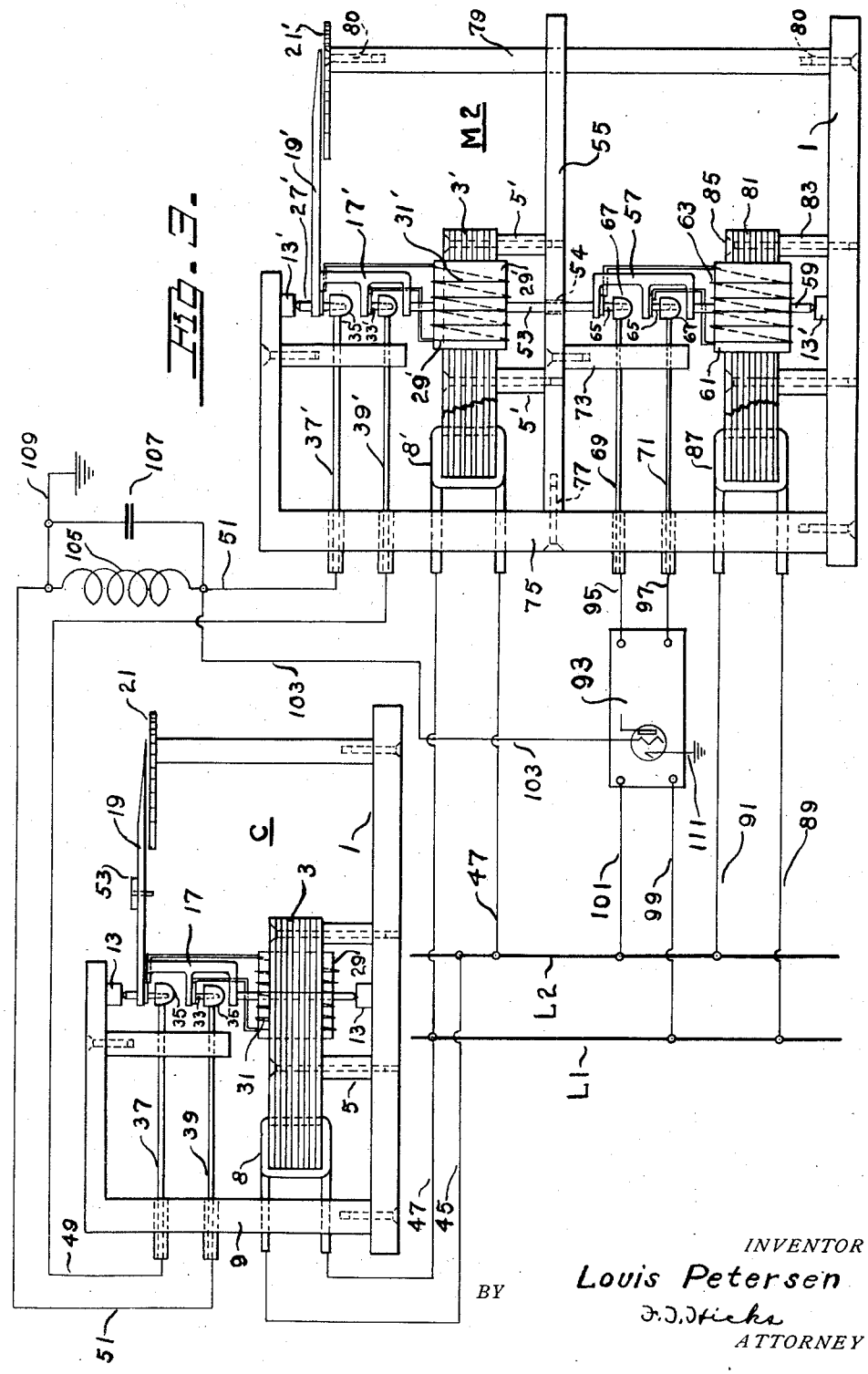

Fig. 4.

INVENTOR
Louis Petersen
BY F.D.Hicks
ATTORNEY

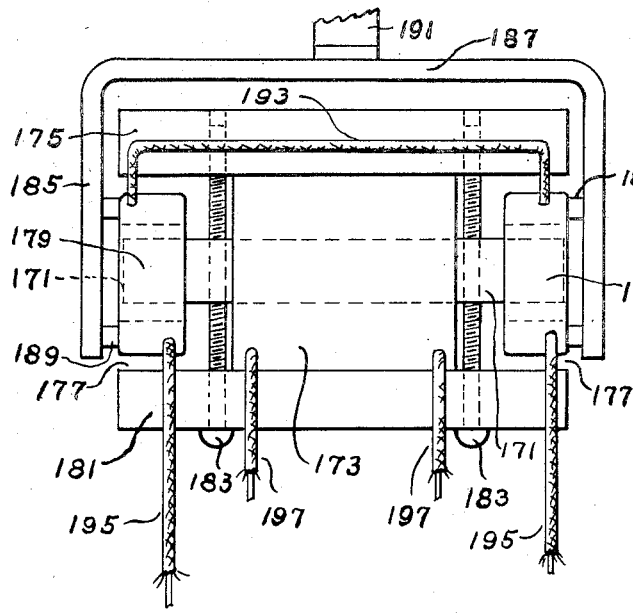
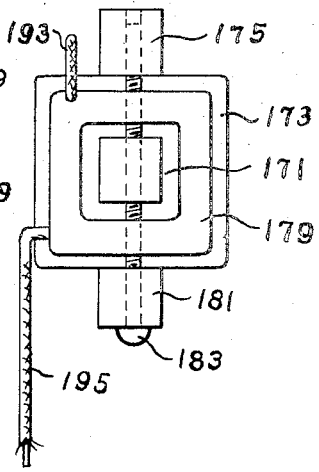
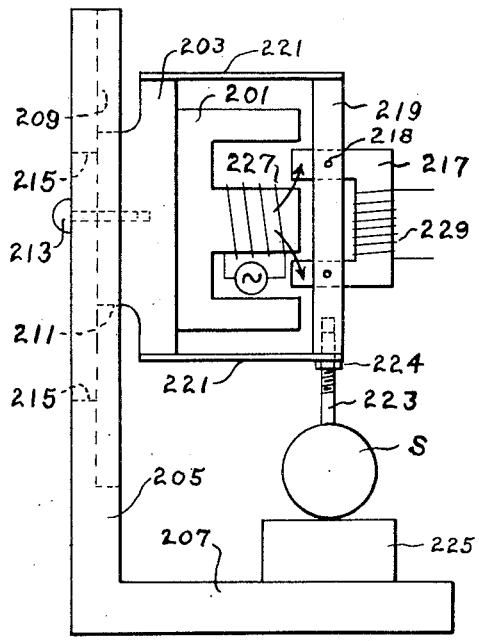
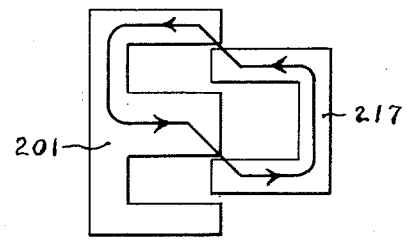
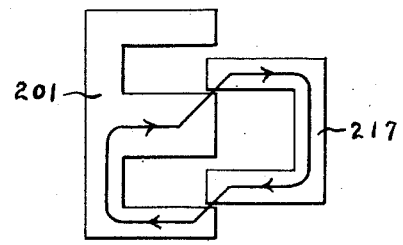

Patented Apr. 28, 1942

2,281,453

UNITED STATES PATENT OFFICE 2,281,453

ELECTROMAGNETIC MOVEMENT REPEATING SYSTEM

Louis Petersen, Detroit, Mich.

Application May 11, 1939, Serial No. 272,991

9 Claims. (Cl. 177—351)

My invention relates to electromagnetic movement repeating systems useful for weighing, measuring and various purposes.

It is an object of my invention to provide an improved electromagnetic movement repeating system which is simple and has positive operating characteristics, and which has a high degree of accuracy substantially unaffected by variations and fluctuations in the supply voltage.

It is also an object of my invention to provide an improved electromagnetic movement repeating system comprising a variable control instrument having a stationary primary winding and a movable secondary control winding mounted adjacent thereto for variable inductive coupling therewith as it is moved by a force or weight to be measured, a meter device also having a stationary primary winding and a movable secondary winding, the two movable secondary windings being connected together in series relation in a closed series circuit in such a manner that the secondary winding of the meter device tends to be moved to a position corresponding to the measuring position of the movable control winding to induce an alternating voltage of equal amplitude and opposite instant polarity into the series circuit thereby reducing to zero the alternating current flowing therein, balancing the system and reaction forces while at the same time moving an associated measuring indicator to its correct indicating position.

It is a further object of the invention to provide such an electromagnetic movement repeating system in which the number of turns of a winding on the meter device is so related to the number of turns of a winding on the variable transformer control device as to greatly multiply the degree of movement of the meter device caused by a predetermined degree of movement of the control device to provide for great sensitivity and fine reading.

Another object of my invention is to provide such an electromagnetic movement repeating system including an auxiliary electromotive device associated with the movable winding of the meter to forcefully move it to a counter balancing position in response to a movement of the control winding, an electronic amplifier for supplying amplified power to the auxiliary electromotive device, and means controlling the amplifier consisting of impedance means in the closed secondary series circuit for providing biasing potentials for the amplifier in accordance with the current flowing in the closed circuit when the system is in an unbalanced condition.

A further object of the invention is to provide such a system in which the amplifier controlling impedance means is a tuned trap or rejector circuit in the closed series secondary circuit to provide for smooth positive control through the amplifier for moving the meter forcefully and positively to its final position.

Another object of my invention is to provide such an electromagnetic movement repeating system in which the control instrument comprises a field structure of magnetizable material of a suitable conformation for defining a flux path having two air gaps in series in the magnetic flux path and in physically aligned relation for cooperatively receiving a secondary winding having turns thereof disposed for simultaneous movement through the both of the air gaps in accordance with a measuring movement imparted thereto.

Further objects and advantages are within the scope of my invention such as relate to the arrangement cooperation and function of the related elements of the structure, to various details of construction and to combinations of parts, elements per se, and to economies of manufacture and numerous other features as will be apparent from a consideration of the specification in conjunction with the drawings disclosing specific embodiments of my invention, similar reference characters being applied to similar elements throughout, in which:

Fig. 1 is a view showing an electromagnetic measuring system arranged in accordance with my invention, the control and the meter instruments being shown in side elevation with the adjacent leg of the field structure of the control instrument broken away to more clearly show the moving winding, and the electrical circuit connections being diagrammatically represented;

Fig. 2 is a plan view of either the control instrument or the meter instrument;

Fig. 3 is a partially diagrammatic view showing another embodiment of my measuring system arranged for positive operation by an electronic amplifier, the adjacent legs of the field structure of the meter instrument being broken away for clearness in showing the movable windings and associated elements;

Fig. 4 is a similar view showing an electromagnetic weighing system arranged in accordance with my invention;

Fig. 5 is a side elevational view showing an improved arrangement of field structure and windings for a sensitive electromagnetic measuring or gaging device;

Fig. 6 is an end elevational view of the device shown in Fig. 5, the coil supporting bracket being omitted for clearness;

Fig. 7 is a side elevational view showing an improved electromagnetic gaging or measuring device; and Figs. 8 and 9 are diagrammatic views illustrating the operation of the electromagnetic gaging or measuring device.

Referring more particularly to Figs. 1 and 2 of the drawings, my improved electromagnetic measuring system comprises a control movement C and a meter movement M which is actuated therefrom. To have similar operating characteristics as well as for reasons of convenience and economy of manufacture, these two instruments may be of substantially identical construction, except that it is desirable to provide different ratios of turns on the windings of these respective devices in order to obtain a multiplied degree of movement in the meter instrument M as compared with the control instrument C, in a manner to be subsequently more fully described.

The control instrument C comprises a base plate 1 on which is mounted a stack of U shaped laminations 3 of sheet iron or other suitable ferromagnetic material. The stack of laminations 3 is supported above the base 1 on suitable spacers 5 having screws 7 passing therethrough into the base for securing the stack of laminations firmly together forming a U shaped field structure mounted in spaced relation above a central portion of the base. A suitable energizing or primary winding 8 is provided on the central yoke of the field structure. An L shaped bracket 9 is mounted on one end of the base in inverted position with the upper end extending over to substantially the center of the base, in which position it is firmly secured in any suitable manner as by a screw 11 extending up through the base into the lower end of the bracket.

A pair of bearing cups 13 are mounted in spaced vertical relation by securing one of the bearings to the under side of the overhanging portion of the L shaped bracket 9, and the other bearing is mounted on a central portion of the base plate 1 directly thereunder. For this purpose any suitable low friction jewels or bearings are used and these may be secured to the bracket and the base in any suitable manner, as by cementing for example.

The lower bearing cup 13 journals the lower end of a vertically disposed shaft 15 which is preferably tapered to provide low friction pivotal journalling therein. The upper end of the pivoted shaft 15 is attached, as by cementing, to the under side of the lower arm of an E shaped rotor bracket 17 which is preferably made of any suitable non-metallic light weight plastic composition material, such as a phenolic condensation product for example. Projecting integrally in opposed relation from the upper arm of the E shaped rotor bracket 17 is a tapered index pointer, or reference index, 19 which extends for movement over an arcuate measuring scale 21. Scale 21 rests upon the upper ends of columns 23 attached vertically to the base as by screws 25 passing therethrough into the lower ends of the columns. A tapered shaft or pivot point 27 extends upwardly from the upper side of the top arm of rotor bracket 17 and journals pivotally in the upper bearing cup in aligned relation with the lower shaft 15.

The lower pivoted shaft 15 passes through a spool 29 which is of some non-metallic material, such as a plastic composition or phenolic condensation product, and the spool is secured on the shaft in any suitable manner as by cementing. A secondary winding or coil 31 is wound upon the spool 29 for rotation in the uniform field produced between the legs of the U shaped field structure 3. The terminals of the secondary winding 31 extend upwardly through the rotor bracket 17 and are soldered to needle contacts 33 which are cemented to and project downwardly from the two uppermost arms of the rotor bracket. To provide frictionless electrical connection from the rotor I provide mercury cups 35 which are attached on the ends of terminal strips 37 and 39, as by soldering. For rigidly supporting the mercury cups in proper positions to cooperate with the needle contacts, the terminal strips 37 and 39 may pass through a support 41 of insulation material which depends from the upper arm of the main bracket to which it may be secured as by a screw 42. Also the terminal strips 37 and 39 pass outwardly through suitable bushings 43 in the vertical leg of the L bracket for permanent connection, as by soldering, to the conductors of the system.

As shown, the meter instrument M is identical to the control instrument C, and the corresponding parts thereof are indicated by similar reference characters primed. As the action of the instruments is at times a transformer action, the instruments may be referred to as variable transformer instruments, one of which is the control or actuating instrument, the other being the controlled or meter instrument. In use the terminals of the primary windings 8 and 8' of the two instruments are connected for energization simultaneously and in phase relation from a convenient source of alternating current as through conductors 45 and 47 connecting to main service lines L1 and L2. From the terminal strip 37 of the control instrument, a conductor 49 is connected to the terminal strip 39' of the meter instrument, and from terminal strip 39 of the control instrument a conductor 51 connects to terminal strip 37' of the meter instrument, as shown. A closed secondary circuit is thus provided connecting the secondary windings 31 and 31' of the two instruments together in series relation. Also as shown, a link 53 may be pivotally connected from the index 19 of the variable control transformer C for connection with any member or device (not shown) which moves in accordance with some quantity or condition to be measured and indicated, such as a pressure gauge, a weighing device, or the like.

Assuming that the instruments are identical in construction and are provided with the same number of turns in each winding, the application of any force through the link 53 causing the index 19 of the control instrument to move, will also cause the index 19' of the meter instrument to move through a corresponding number of degrees on the associated measuring scale 21', and a measuring indication is then provided for convenient observation by an attendant. In order to have the index members 19 and 19' track or move in the same directions the connections must be properly established which is readily determined as will be understood.

The operation of the meter instrument is caused by the rotation of the control winding 31 of the control instrument from its neutral or central position to a position in the alternating field such that it has an alternating potential induced therein corresponding in amplitude to the extent of rotation from the central position which in turn corresponds to the magnitude of the quantity or condition which is to be measured and remotely indicated. This causes a current to flow around the closed series circuit through conductors 49 and 51 and through the movable winding 31' of the meter. But the movable winding of the meter instrument is exposed in an internating field which corresponds in intensity and phase relation to the field of the control instrument, because both primary windings 9 and 9' are energized from the same main source.

The current flowing in the movable winding 31' of the meter and reacting upon the field thus causes the movable meter winding to turn in a proper direction and to a proper position to induce an equal potential in such a direction or instant polarity that it opposes the potential of the control winding 31 in the series secondary circuit. The movable secondary winding of the meter instrument M is thus moved automatically to balance to zero the current flowing in the series secondary circuit, balancing to zero reaction forces set up against the measuring force and at the same time moving the indicating index pointer 19' to provide a measuring indication.

In order to provide a sensitive fine reading arrangement it may sometimes be desirable to greatly multiply the movement of the meter instrument as compared with the movement of the control instrument, especially when the condition or quantity to be measured and indicated provides for only a small degree of movement of the control winding 31 of the control instrument C. In my system a greatly multiplied degree of movement of the meter instrument may be obtained by selecting the number of turns of a winding of one of the instruments differently than the number of turns in a winding of the other instrument. If the number of turns on either winding, or both windings, of the control instrument is substantially greater than the number of turns in either winding of the meter instrument with which it cooperates, assuming the structures are otherwise identical, a multiplied movement of the meter index will be obtained. A great multiplication of the movement of the meter may thus be obtained in a very simple and convenient manner in my measuring system and a very sensitive fine reading arrangement is provided.

Referring now to Fig. 3 of the drawings there is shown another embodiment of my improved electromagnetic measuring system which is especially sensitive and powerful. In this system a similar variable transformer control instrument C may be used, and also the upper portion of the meter instrument M2 may be similar to that described and shown in the first embodiment in Figs. 1 and 2, as indicated by the application of similar reference characters to corresponding parts. The parts of the measuring system shown in Fig. 3 cooperate together in the same manner as the corresponding parts of the system of Fig. 1, but the modified meter movement M2 includes an auxiliary electromotive means in the lower portion for applying amplified power impulses to forcefully and positively turn the secondary meter winding 31', and the associated indicator, to its actuated positions in a manner to be subsequently described.

For this purpose the secondary meter winding 31' of the modified meter instrument M2 is rotatably supported on a shaft 53 which is secured at its upper end to the lower arm of the E shaped rotor bracket 17' and this shaft is extended so that the lower end projects down through a suitable aperture 54 in an elevated base 55. The lower end of the extended shaft 53 rests on and is secured to the upper arm of a second E shaped rotor bracket 57 the lower arm of which is secured upon the uppermost end of a pivot shaft 59 which is in aligned relation with the shafts 53 and 27'. At the lower end the shaft 59 is tapered and it is pivotally journalled in the bearing cup 13' mounted on the main base 1. The shaft 59 passes through a spool 61 which is cemented thereon or secured in any suitable manner. On the spool 61 a winding 63 is wound and the terminals thereof extend upwardly through the rotor bracket 57 and are soldered to two needle contacts 65, one of which is cemented on the under side of the middle and the uppermost arms respectively of the rotor bracket.

To provide a friction free connection from the meter instrument, mercury cups 67 are supported in contacting position under the contact needles by attachment to the ends of terminal strips 69 and 71 which pass through suitable apertures in a depending bracket 73 and the vertical leg of an L shaped bracket 75, similar to the control instrument. One edge of the elevated base plate 55 may be secured to the mid-portion of the vertical leg of the main bracket 75 as by a screw 77 passing therethrough. The opposite edge of the elevated base 55 is attached in any suitable manner to the mid-portion of columns 79 which support the measuring scale 21' of the instrument on the upper ends. The ends of columns 79 may be attached by screws 80. Mounted on the main base plate and spaced slightly above it is a field structure 81 consisting of a stack of U shaped laminations secured together upon spacer columns 83 by screws 85 passing through into the base.

The extended legs of the U shaped field structure 81 are disposed on opposite sides of the rotatable winding 63 of the auxiliary electromotive means, and a stationary winding 87 is wound upon the central yoke for connection through conductors 89 and 91 to be energized from the same alternating current service mains L1 and L2 as the other stationary windings of the system. Although the auxiliary electromotive means is shown of similar construction to the other instruments, it is to be understood that various other structural arrangements may also be utilized although greater convenience and economy is obtained by using similar constructions throughout.

For energizing the movable power winding 63 to turn the meter rotor assembly forcefully to its actuated positions, an electronic amplifier 93 is provided and the output terminals thereof are connected by conductors 95 and 97 to the terminal strips 69 and 71 of the meter instrument. For power energization the amplifier 93 is connected through conductors 99 and 101 to the same alternating current service mains L1 and L2 as the primary windings of the instruments. A control energizing connection 103 extends from the amplifier grid input to connect with the conductor 51 of the closed series circuit connecting between the movable secondary windings of the instruments.

Inserted in the conductor 51 is impedance means comprising an inductance 105 and a condenser 107 for applying suitable biasing voltages to operate the amplifier in accordance with the current circulating in said closed series circuit while the circuit is unbalanced. For this purpose the inductance 105 and the condenser 107 are connected in parallel relation and in series in one side of the closed series circuit between the winding 31 of the control instrument and the winding 31' of the meter instrument. The inductance 105 and the condenser 107 are selected or adjusted of suitable combined values to form a trap or a rejector circuit tuned to resonance at the frequency of the alternating current supplied by the power mains L1 and L2. A grounded connection 109 is connected to one junction of the rejector circuit thus provided. The amplifier control connection 103 connects from the other terminal of the rejector circuit 105 and 107 to the grid of the first tube of the amplifier the cathode being connected to a ground 111. The amplifier is designed to pass the amplified impulses without appreciable time lag, or a suitable phase shifting network may be provided in a well known manner.

In operation any variable quantity or condition to be measured actuates the control instrument C through the connector link 53 to turn the rotatable secondary winding 31 from its central or neutral position to a position where the alternating field set up by the primary winding 8 induces therein an alternating potential in accordance with the quantity to be measured. As a result an alternating current tends to flow in the closed series circuit 49 and 51 through the movable secondary winding 31' of the meter instrument M2 similarly to the system previously described, except that the magnitude of the series unbalanced current is not so great in this embodiment because of the tuned rejector circuit 105 and 107 therein. The alternating current in the series circuit energizes the meter secondary winding 31' in a suitable phase relation to the alternating field set up by the adjacent primary winding 8' to tend to rotate it to such a position that it induces an equal and opposite alternating potential opposing the potential applied in the series circuit from the control winding 31, as in the first embodiment. In this operation an alternating biasing potential is set up across the terminals of the rejector circuit between the ground connection 109 on one side and the amplifier control connection 103 on the other side, and the amplifier 93 is energized to supply amplified power impulses to the power winding 63 of the meter instrument M2. The oscillatable elements of the control and meter instruments may be damped by means of vanes, or other means (not shown), as will be understood.

As a result of the amplified power impulses supplied to the power winding 63 of the meter instrument, the movable secondary winding 31', and the indicator are forcefully turned through the interconnecting shaft 53 to a position where the winding 31' induces an alternating potential in the closed series control circuit 49 and 51 which is equal and opposite to that set up by the control secondary winding 31. When this condition is attained the alternating current in the series circuit 49 and 51 is reduced to zero and the system is balanced until another variation of the quantity to be measured acts through the link 53 to move the control winding 31 to a new position, when the operation is repeated. In each indicating and measuring position of the meter indicator 19' the current in the closed series circuit is balanced to zero and there is no reaction back on the measuring force which initiated the movement.

By providing more turns on either or both windings of the control instrument, as compared with the windings of the meter device, the degree of movement of the meter indicator may be greatly multiplied and, with the aid of the amplified power applied and controlled in this embodiment a very sensitive and fine reading system is provided so that it is found that in operation only a small movement of the control device is sufficient to move the meter instrument indicator over the full range of the measuring scale 21'. The accuracy of my measuring system is not adversely influenced by fluctuations of the line voltage or variations in amplifier tube characteristics which only affect the power or force with which the indicator is moved to its actuated positions which is ample for all requirements.

Referring to Fig. 4 I have shown a fine weighing scale arranged in accordance with my invention. Such an instrument comprises a suitable base plate 115 having a pair of upright columns or standards 117 rising vertically from opposite sides thereof. Secured between the upper ends of the uprights 117 are a pair of flat bars 119 and 121 disposed in spaced relation and clamped to the uprights as by screws 123 passing therethrough. Similarly disposed in spaced relation between intermediate portions of the uprights 117 and on opposite sides thereof is a second pair of flat bars 125 and 127 which are clamped thereon as by screws 129. The bars 119, 121, 125 and 127 are of any suitable nonmagnetic material having sufficient strength and resilience to firmly clamp two stacks of U-shaped stampings therebetween. The lower stack 131 of stampings is supported in an upright position while the upper stack 133 of stampings is supported in an inverted position with the lower ends of the legs of the U in spaced relation above the upper ends of the legs of the lower structure to define a pair of air gaps 134 therebetween which are in aligned positions. Secured on the upper surface of the yoke of the uppermost stack of laminations 133 is a stand 135 having vertical columns 137 rising therefrom and suitably notched to provide bearings at the upper ends.

The moving parts of the weighing instrument may consist of any conventional arrangement of balanced oscillating elements and may comprise a weighing member such as a beam 139 which swings on bearings 141 seated in the notched bearings in the vertical columns 137. Also as shown the right hand end of the beam is provided with an upturned bearing edge 143 which is downset from the main axis of the weighing beam for pivotally supporting the upper leg of a U shaped yoke 145 and from the lower leg thereof a platform 147 is suspended to receive articles or material to be weighed. Depending rigidly from the mid-portion of the balanced beam is a counterweight 149 which oscillates between the columns 137 and is of sufficient weight to balance the weighing beam with all the movable elements which are connected to move therewith. At the left hand end of the weighing beam 139 a reduced portion 151 extends for supporting an adjustable weight 153 which may be slidably or threadably disposed thereon for adjusting the balance of the entire weighing system.

In accordance with my invention the balanced weighing beam 139 receives the upper ends of a pair of rods 155 which may be threaded for securement in suitably threaded apertures in the beam as will be understood. The lower ends of the rods 155 extend down between the flat bars 119 and 121 on opposite sides of the U shaped field structure 133 which is clamped therebetween, and two coil supporting strips 157 are supported between the lower ends of the rods in a suitable position to be carried freely through the aligned air gaps 134. The coil supporting strips 157 may be supported and clamped together by nuts 159 threaded upon the lower ends of the rods for firmly supporting and clamping a pan-cake coil 161 of flat thin conformation therebetween. Because of the thin shape of the pan-cake coil and the manner in which it is mounted, the air gaps 134 may be quite short for providing low reluctance and high flux density. Also the voltage induced between adjacent turns of the coil 161 is relatively low which minimizes insulation requirements.

On the upper ends of the rods 155, which may be threaded for receiving the same, are counter weights 160 which are adjusted to coincide the center of gravity of the oscillatable system with the bearing edge 141. Windings 163 are provided on the U shaped laminated field structures 131 and 133 for energizing these in series aiding relation so that the flux path includes the two aligned air gaps 134 in series relation.

The pan-cake coil 161 is so supported and positioned that the opposite sides of each turn of the coil passes through a different one of the spaced air gaps 134 and the turns are equally positioned in the two respective air gaps when the weighing beam 139 is in its central position. In this condition the voltage induced in one side of any given turn of the pan-cake coil is equal and opposite to the voltage induced in the other side of the same turn and voltages neutralize without adding up and producing high voltage tending to break down the coil.

When any weight is added on the platform 147 the pan-cake coil 161 is moved to the left with the result that the left hand side of the outermost turn of the coil is moved to the left and away from the intense flux concentration while at the same time the right hand side of the same turn of the coil is carried into a more intense flux concentration in the right hand air gap. Also more flux then threads the coil from the left hand gap and less from the right hand gap. The transformer action of the device then causes an alternating potential to be induced in the coil in accordance with some function of its displacement from the central position, which is produced by induction from the alternating flux rather than by the physical movement of the coil in the field. Conductors 164, 165 and 166 connect the stationary windings 163 of the weighing device for energization from the main service lines L1 and L2 in phase relation. The oscillating movement of the balanced weighing beam 139 may be damped if desired by various conventional arrangements as by a vane movable in oil (not shown) or in any suitable manner as will be understood.

For translating the movements of the oscillating system into manifestations signifying the measurement information desired by the user of the sensitive weighing device, conductors 51 and 49 are connected from the terminals of the pan-cake coil 161 to a suitable meter indicating device similarly to the systems previously described. For this purpose I preferably utilize such a meter device M2, as shown in Fig. 3, used in combination with an electronic amplifier 93 as previously described. In the sensitive fine weighing system thus provided, the conductors 49 and 51 connect the pan-cake coil 161 in series relation with the movable secondary meter winding 31' also including in the circuit impedance means providing biasing potentials for the amplifier control as previously described. Similarly the impedance means preferably comprises an inductance 105 and a condenser 107 selected or adjusted to be tuned to resonance at the frequency of the alternating current supplied by the main lines L1 and L2 for energizing the stationary windings.

Operation of the weighing system resulting from placing an article on the platform to be weighed is that the pan-cake coil 161 is deflected from its central inductively balanced position, in accordance with the weight on the scale 147, inducing a corresponding alternating potential which energizes the closed series circuit 49 and 51 connecting to the meter instrument M2. Amplified power impulses are then applied to the power coil 63 of the meter causing the indicator 19' and the secondary meter coil 31' to be moved to a proper indicating position relative to the scale. At the same time a counter alternating potential is induced of a proper magnitude and phase relation for balancing to zero the current in the closed series circuit in the manner previously described, which will not be repeated.

Because the current in the closed series circuit 49 and 51 is balanced to zero when the meter is indicating the weight on the platform, there is no reaction force acting back on the weighing beam to cause inaccuracy. Fluctuations of the line voltage or changes in the amplifier tubes do not have any effect on the accuracy of the system, but only on the force or speed of operation which is ample for all operations. The degree of movement of the pan-cake coil required for operating the full range of the meter indicator is very minute.

In Figs. 5 and 6 I have shown a different embodiment of the control coil and field structure arrangement which may be utilized in my sensitive weighing device, or for other measuring purposes where great precision and accuracy are necessary. Fig. 5 is a side elevational view and Fig. 6 is an end elevational view with the coil supporting yoke member and end brackets omitted. In this embodiment the stationary field structure comprises a ferro-magnetic core 171 of suitable fine laminations or wire having an energizing or primary winding 173 on an intermediate portion with both ends of the core projecting therefrom. A field member 175 of similar dimensions is disposed substantially parallel to the core and spaced suitably from the ends of the core to provide a low reluctance path for the flux forming a pair of air gaps 177 in series in the flux path. The air gaps 177 are disposed in aligned relation and are of suitable dimensions to permit movable secondary control coils 179 to slide freely upon the ends of the core 171. A second field member 181 may be similarly spaced from the opposite sides of the stationary energizing coil as shown, and there may be a greater number of such spaced field members, if desired. The field members 175 and 181 are secured together with the core 171 in predetermined spaced relation by suitable spacing members, such as screws 183, of non-magnetic metal passing threadably therethrough.

To support the secondary coils 179 together as a rigid movable unit, both of these coils are secured as by cementing to end brackets 185 projecting from a yoke member 187. Spacers 189 are cemented between the coils and the brackets 185 to provide space for movement relative to the stationary core 171. An arm 191 projecting from the middle of the yoke 187 may be connected with any measuring mechanism or device for moving the coils 179 in accordance with a quantity or condition to be measured. The movable coils are so wound and spaced that when disposed in a certain central or balanced position relative to the core, equal alternating potentials are induced in the two coils. A conductor 193 is connected between the terminals of the movable secondary coils which have the same polarity during a given half-cycle, and conductors 195 connecting from the other terminals of the coils are extended for connection with a meter device or amplifier to be actuated. From the stationary or primary coil terminals 197 extend for connection with any suitable source of alternating current for energizing the electromagnetic measuring device.

The movable coils being connected together in series opposing relation balance when in the central position, but when the coils are moved slightly from the central position one of the coils enters a weaker field while the other coil is exposed to a stronger field, and the opposing alternating potentials are no longer balanced. The movable coils may be provided with a large number of turns and the arrangement shown is very effective in producing a high alternating voltage when the coils are shifted only very slightly from the central or neutral position and very sensitive measurements may be obtained.

In Fig. 7 is shown an electromagnetic measuring or gaging indicator control device which comprises a magnetizable member or field structure 201 of substantially E shaped conformation having three legs spaced apart and joined through a body or yoke integral therewith. The field structure 201 is secured to a mounting bracket 203 in any suitable manner and the bracket is attached to a vertical standard 205 which rises vertically from a base plate 207 for mounting the device. The standard 205 is preferably provided with a dovetail slot 209 for receiving a dovetail 211 from the field bracket 203 to permit vertical adjustment thereof. The field bracket 203 is secured in any adjusted position by means of a screw 213 passing threadably therein through a slot 215 in the back of the vertical standard. By loosening the screw 213 the field bracket can be lifted or lowered and then the screw is tightened to hold the bracket firmly on the standard. The base 207 and the standard 205 may be integral of a suitable non-magnetic metal.

A U shaped inductor member 217, of magnetizable material, is provided which comprises two legs spaced apart and joined by a yoke and of suitable dimensions to have the ends of the two legs inserted into the spaces between the three spaced legs of the field structure 201. Sufficient clearance is provided between the inserted legs of the U member 217 and the adjacent legs of the E shaped field structure 201 to permit the U shaped inductor member to move vertically sufficiently to accomplish the desired measuring movements.

For guiding the movements of the movable inductor member 217 through a predetermined path relative to the stationary field member 201, a vertical supporting bar 219 attached thereto as by screws 218 is mounted between the outer ends of a pair of resilient connector members 221 which extend horizontally and have the other ends attached to the upper and lower ends of the field bracket 203 which is extended sufficiently so that the connectors 221 have clearance. Projecting down from the lower end of the support 219 and threadably adjustable therein is a gauging pin 223, which is secured by a lock-nut 224, and which has its lower end spaced sufficiently above a measuring anvil 225 mounted on the base. Suitable windings 227 and 229 respectively are provided on the middle leg of the E shaped field member and on the yoke of the U shaped movable inductor member. Although either winding may be utilized as the primary energizing winding, I prefer to utilize the stationary winding 227 on the E shaped field structure for this purpose, and when the device is installed this winding is connected to the service mains for suitable alternating current energization.

In operation an intense alternating flux passes from the middle leg of the stationary field structure 201 through the spaces toward the outer legs of the field structure, also passing through the ends of the inserted legs of the movable inductor member 217. When the movable member is positioned in the central position, the four small air gaps adjacent the legs thereof are equally divided, and flux passes equally in both directions from the center leg of the field through both inserted movable legs and does not tend to pass through the interconnecting yoke of the movable member. Under this condition, which is represented in Fig. 7, no alternating potential is induced in the inductor winding. When a member to be measured, such as a shaft S for example, is inserted between the gaging pin 223 and the anvil 225, the movable inductor member 217 is lifted upwardly by an amount which may be the amount that the shaft diameter is greater than a passable minimum for example. The air gaps below the legs of the movable inductor member 217 then become greater and the air gaps above these members then become shorter and a substantial shunting of the flux through the inductor member occurs as represented in Fig. 8. Under this condition an alternating potential is induced in the winding 229 of the movable inductor member which induced potential corresponds to the quantity to be measured. By connecting the terminals of the winding 229 with any suitable metering system, such as that previously disclosed, for example, a definite measuring indication is obtained. If the movable inductor member moves downwardly from the center balanced position flux is also shunted through the magnetizable inductor member in the manner illustrated in Fig. 9. By adjusting the field bracket at any suitable height on the standard, the device can be conveniently adjusted for gaging within any range of dimensions desired, and when used with such a meter amplifying system as that previously described extremely accurate measurements may be conveniently made.

It is apparent that within the scope of my invention modifications and different arrangements may be made other than herein disclosed, and the present disclosure is illustrative merely, the invention comprehending all variations thereof.

I claim:

1. An electromagnetic movement repeating and amplifying system comprising, a variable control transformer device having a stationary primary winding and a movable secondary control winding mounted adjacent the primary winding for movement to variable inductive coupling therewith, means for actuating said secondary control winding into various inductive coupling relations with the adjacent primary winding in accordance with a quantity or condition to be measured, a cooperative device having a stationary primary winding, a movable secondary winding supported movably adjacent the primary winding of said cooperative device for variable inductive coupling therewith, conductive means for energizing the two primary windings from a suitable source of alternating current, conductive means forming a closed secondary circuit for connecting the movable secondary windings of said devices together in series relation so that current from the control secondary winding aids the secondary winding of the cooperative device to be automatically moved to a proper position to induce an alternating potential of equal amplitude and opposing polarity applied in the secondary circuit in response to a movement of the control secondary winding and thus balancing the current substantially to zero in the control secondary winding while moving the cooperative device to predetermined corresponding positions, impedance means in said secondary circuit providing biasing potentials in accordance with current flowing in said circuit while the system is in an unbalanced condition, an electronic amplifier, conductive means for applying said biasing potentials from said impedance means to the input of said amplifier, electromotive means mechanically connected with the movable secondary winding of the cooperative device for applying amplified power to forcefully move said secondary winding in accordance with the movements of the movable control winding, and means connecting the output of said amplifier to apply amplified power impulses to energize said electromotive means moving the secondary winding of said cooperative device while current is flowing in the series secondary circuit, the movement of said winding stopping when a balanced condition of the system is produced and current no longer passes through the impedance means.

2. An electromagnetic movement repeating and amplifying system comprising, the combination set forth in Claim No. 1, and said impedance means in the closed series circuit between the movable secondary control winding and the movable secondary winding of the cooperative device consisting of a rejector circuit tuned to a frequency having a predetermined relation to the frequency of the alternating current which energizes the primary windings.

3. An electromagnetic movement repeating and amplifying system, as defined in Claim No. 1 in which the electro-motive means energized by the electronic amplifier comprises, a rotatable shaft on which said secondary winding of the cooperative device is mounted adjacent the stationary primary winding, said shaft being extended substantially therefrom, a rotatable power winding mounted on the extended portion of said shaft, a stationary winding adjacent the power winding and energized from the same source of alternating current as both said primary windings.

4. An electromagnetic movement repeating and amplifying system, as defined in claim No. 1 and having the number of turns of a winding on the cooperative device so selected with reference to the number of turns in a winding on the variable control transformer device as to greatly increase the degree of movement of the cooperative device caused by a predetermined degree of movement of the control device to provide a sensitive movement repeating arrangement.

5. An electromagnetic movement repeating system comprising, a movable member, bearing means for pivotally mounting said movable member, coil support means projecting from said movable member, an electrically conductive winding carried by said support means for movement in accordance with the movements of the pivoted member, the pivoted member and the parts movably connected therewith being suitably counterbalanced, a winding mounted stationary adjacent said movable winding, said windings being so related that in the center position of the movable member a balanced inductive relation prevails and when the movable member swings from the center position the movable winding is carried into an effective inductive coupled relation with the other winding one of said windings being energized from a suitable source of alternating current so that an alternating potential is induced in the other winding in accordance with the unbalanced position of the movable member, a second movable member, two separately energizable windings mounted for simultaneous movement to actuate the second movable member, a pair of stationary windings one being disposed adjacent each one of the separately energizable windings, means for energizing both of said stationary windings from the same source of alternating current from which one of the first mentioned windings is energized, conductive means for connecting one of the movable windings adjacent said second movable member together in a closed series circuit with the movable winding adjacent the first mentioned movable member to receive induced alternating current therefrom, an electronic amplifier, means connecting the output of the amplifier to supply amplified power impulses to the other movable winding adjacent the second movable member, an impedance means in said closed series circuit, and conductive means for applying biasing potentials from said impedance element to the input of the amplifier in accordance with the current flowing in said series circuit while the system is in an unbalanced condition for supplying amplified power impulses to quickly actuate the second movable member to a position balancing the current substantially to zero in the closed series circuit.

6. An electromagnetic movement repeating system comprising, the combination set forth in claim No. 5, and said impedance means in said closed series circuit between the movable winding of the first movable member and the movable coil of the second movable member being a rejector circuit tuned to a frequency having a predetermined relation to the frequency of the energizing alternating current by which the stationary coils are energized.

7. An electromagnetic movement repeating system comprising, a movable member, means for movably mounting said movable member, winding support means projecting substantially from said movable member for amplified movement in response to movements of said member, an electrically conductive winding carried by said winding support means, a field structure of magnetizable material forming a flux path having two air gaps disposed in aligned relation, said winding being suitably positioned and of a suitable conformation for having turns thereof movably positioned simultaneously in both of said air gaps so that a balanced inductive relation is produced in the center position of said movable member, said movable member being normally counterbalanced to a predetermined center position from which it may be deflected, a stationary winding on said field structure for energizing the same from a suitable source of alternating current, and means responsive to induced alternating current from said movable coil for reproducing movements and for balancing to zero the current from said winding to eliminate the mechanical forces set up by the reaction of such currents on the field from the stationary field structure.

8. An electromagnetic movement repeating system comprising, the combination set forth in claim No. 7 and the winding having turns positioned simultaneously in said air gaps being a pan-cake coil with the opposite sides of the turns thereof disposed in the respective air gaps.

9. An electromagnetic movement repeating system comprising, the combination set forth in claim 7, and the field structure including two U-shaped magnetizable structures disposed with the ends of the legs thereof in aligned spaced relation to form a magnetic flux circuit having two air gaps in series therein and disposed in physically aligned positions, and the winding positioned simultaneously in both said air gaps being a pan-cake coil with the opposite sides of the turns of the coil disposed in the respective aligned air gaps.

LOUIS PETERSEN.